July 13, 1937. F. BARZ ET AL 2,086,994
CURRENT REGULATION THROUGH GRID CONTROLLED VAPOR DISCHARGE VESSELS
Filed April 27, 1932
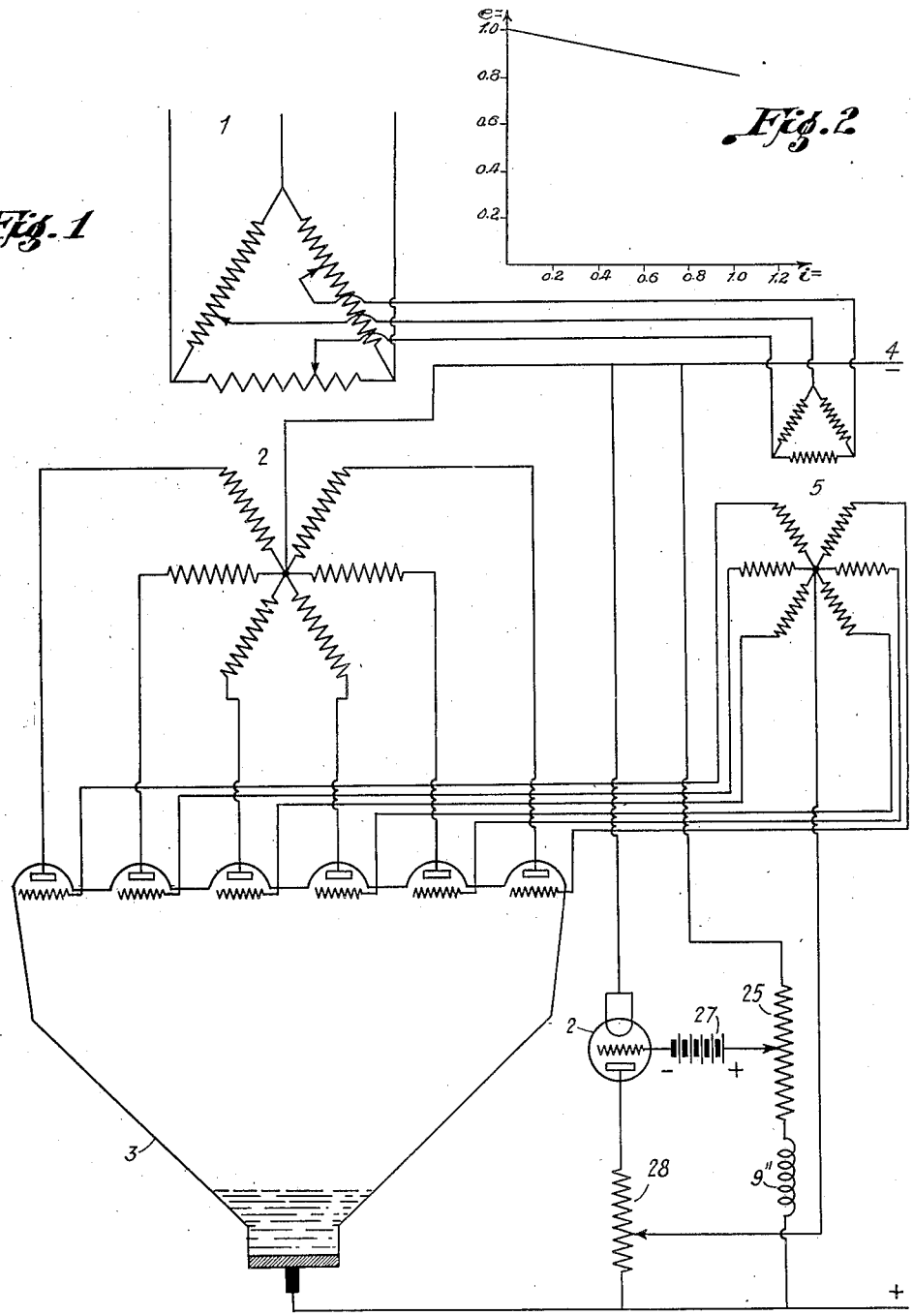
INVENTORS
FRIEDRICH BARZ
CARL BRABAND
BY
ATTORNEY Patented July 13, 1937

2,086,994

UNITED STATES PATENT OFFICE 2,086,994

CURRENT REGULATION THROUGH GRID-CONTROLLED VAPOR DISCHARGE VESSELS

Friedrich Barz, Berlin-Lankwitz, and Carl Braband, Berlin-Wilmersdorf, Germany, assignors to Allgemeine Elektricitatz Gesellschaft Friedrich Karl Ufer, Berlin, Germany Application April 27, 1932, Serial No. 607,760
In Germany April 28, 1931

1 Claim. (Cl. 175—363)

In the Austrian Patent No. 122,390 of Gustav Wilhelm Müller, an arrangement adapted to regulate the flow of current across arc-type rectifiers has been disclosed in which the control potential supplied to or impressed upon the grid circuits is composed of a variable D. C. potential and an A. C. potential of constant size and phase. In the arrangement previously disclosed the adjustment of the magnitude of the D. C. potential is effected manually.

Now, the present invention is an improvement upon the basic idea disclosed in the said above mentioned patent in that the adjustment of the variable control D. C. potential is insured automatically in dependence upon the current or the potential of the consumer or load circuit. The automatic adjustment of the magnitude of the D. C. control potential is particularly desirable and suitable in the case of remote-controlled rectifier sub-stations or sub-stations of the kind working without attendant.

Fig. 1 illustrates the adjustment of the D. C. control potential as a function of the consuming or load circuit. Fig. 2 illustrates the voltage-current relationship.

Fig. 2 shows that the D. C. potential $e=$ increases with growth of load current $i=$. Now, for each and every value of the regulable D. C. potential it is possible to obtain a similar relation as shown in Fig. 2, and it is thus feasible to make conditions so that for a steady variation of the variable D. C. control potential, the D. C. potential $e=$ fed to the consumer 4 will remain constant regardless of the load current $i=$.

Fig. 1 shows an exemplified embodiment of the idea underlying this invention in which the adjustment of the variable control D. C. potential is effected as a function of the potential of the consuming or load circuit. The D. C. potential generated by the rectifier means is fed to the grid circuit of a thermionic tube 26 by way of a variable potentiometer 25 which has in series with itself a smoothing choke-coil 9''. The grid circuit further contains an invariable D. C. potential such as a battery 27. The anode circuit of the thermionic tube 26 is fed from the resultant D. C. potential, the anode current is caused to flow across a variable resistance 28. The fall of potential occasioned across the latter serves as a variable control D. C. potential for the grid circuit of the grid-controlled rectifier 3. The control A. C. of constant value and phase is fed to the grid circuits by way of a control transformer 5.

The operation of the circuit scheme shown in Fig. 1 shall be described as follows: In the presence of a definite load the assumption is that the resultant D. C. potential has its prescribed or desired magnitude. Owing to a growth of load the resultant D. C. potential will decrease (see Fig. 2). This has the consequence that the effective grid potential of the thermionic tube 26 will be shifted towards the negative end. As a result the plate current flowing through the resistance 28 diminishes, and thus also the negative control D. C. potential prevailing in the control or grid circuits of the rectifier 3. Owing to the reduction in the said control D. C. potential the starting or striking of the various anode currents of the rectifier 3 will occur at an earlier instant inside each period, in other words, the D. C. potential delivered by the rectifier grows. As can be readily understood the increase in potential caused by a fall in the load results by the aid of the thermionic tube 26 in a rise in the negative control D. C. potential, in other words, the ignition of the various anode currents is caused to happen at a later instant inside each period or cycle, which, in turn, means a reduction in the D. C. potential produced by the rectifier.

The embodiment shown by way of example in Fig. 1 offers the advantage that the D. C. potential to be subjected to control adjusts the variable control D. C. potential directly by electrical means, i. e., by the agency of a separate battery and a thermionic tube. This method offers this further merit that regulation is insured steadily and with greater sensitiveness. Maximum sensitiveness is obtained when the entire resultant D. C. potential is introduced in the grid circuit of the tube 26, and when the fall of potential produced across the resistance 28 is fed to the grid circuits of the rectifier 3, undiminished. However, in a regulating scheme as shown in Fig. 1 it is necessary that a distinct source for furnishing the D. C. potential should be provided, which is practically not called upon to furnish any energy at all; but inasmuch as constancy or stability is required for this D. C. source of potential it will generally not be derived from the A. C. network 1 by way of a separate rectifier. The heating energy for the cathode of the thermionic tube 26 should preferably be derived from the A. C. network by way of a transformer as is well known in the prior art.

Automatic regulating means as hereinbefore disclosed are most advantageously used in connection with rectifier installations, though it will be understood that the fundamental idea could be used also in other conversion arrangements such as transverters and frequency-changers.

We claim:

A circuit arrangement for regulating the flow of direct current in a load circuit through grid-controlled vapor discharge tubes, comprising a vapor discharge tube having a cathode, a plurality of anodes and control grids, a variable direct current potential load circuit connected to the output of said vapor discharge tube, a three-phase alternating current potential source of constant magnitude and phase to supply the input potential to said vapor discharge tube, said alternating current potential comprising a control transformer having separate windings, each winding being connected to a control grid of said discharge tube, an electron discharge relay having anode, grid and cathode, a voltage divider for adjusting the direct current potential of said load circuit, a separate source of constant D. C. potential, the grid of said electron discharge device being connected to said separate source of D. C. potential and to a tap on said voltage divider, the outside ends of said voltage divider being connected across the load circuit, a choke coil in series with said voltage divider and said load circuit, a second voltage divider, the anode of said electron discharge device being connected to one outside end of said second voltage divider, the other outside end of said second voltage divider being directly connected to the cathode of said vapor discharge tube and said load circuit, a tap on said second voltage divider connected to a common point on the windings of said control transformer, the cathode of said electron discharge device being connected to the other side of said load circuit.

CARL BRABAND.
FRIEDRICH BARZ.